Patented Feb. 24, 1925.

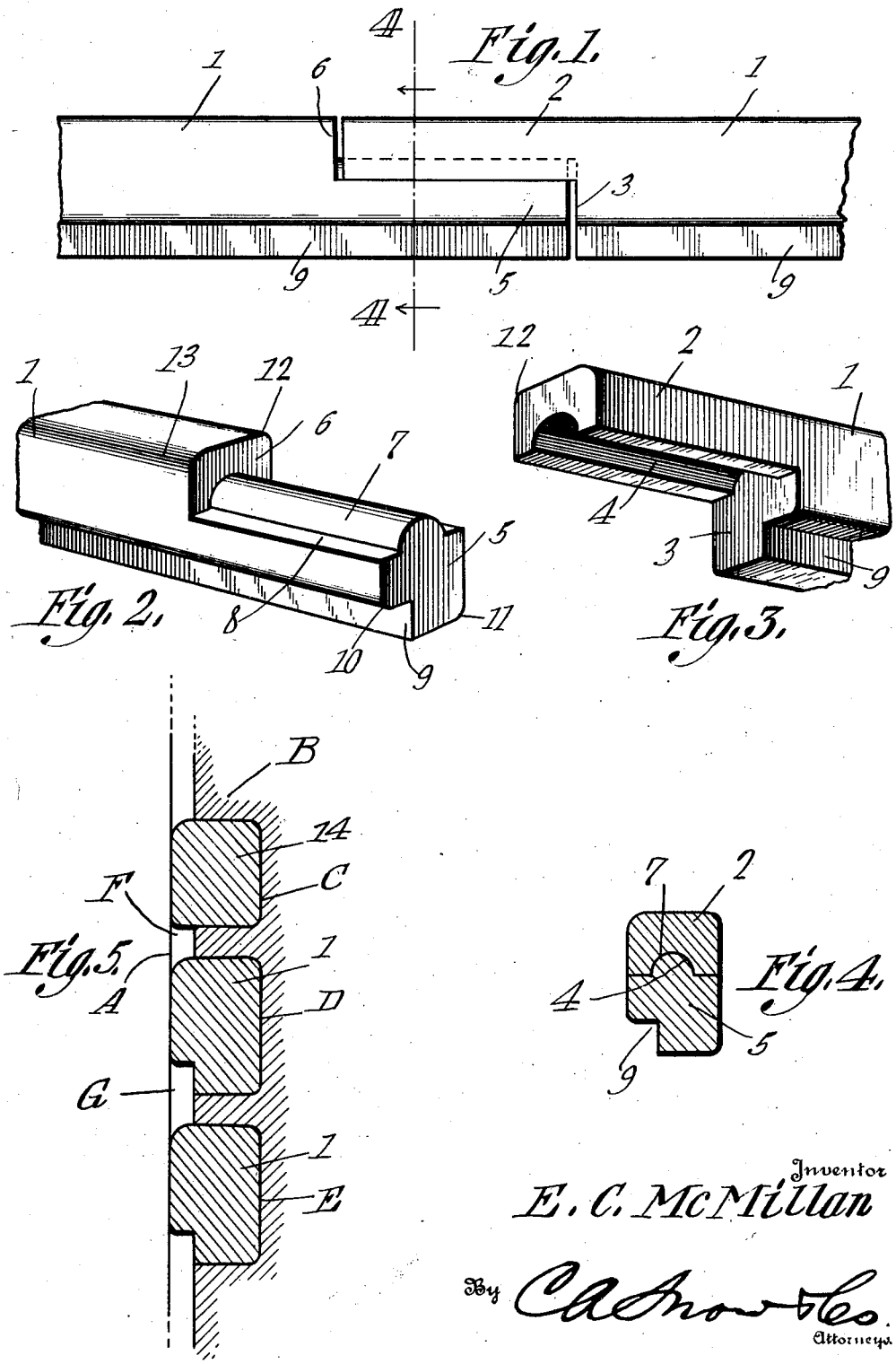

1,527,260

UNITED STATES PATENT OFFICE.

EUGENE C. McMILLAN, OF DALLAS, TEXAS, ASSIGNOR OF ONE-THIRD TO LOYD B. SMITH, OF DALLAS, TEXAS.

PISTON RING.

Continuation of application Serial No. 581,661, filed August 14, 1922. This application filed April 7, 1924. Serial No. 704,801.

*To all whom it may concern:*

Be it known that I, EUGENE C. McMILLAN, a citizen of the United States, residing at Dallas, in the county of Dallas and State of Texas, have invented a new and useful Piston Ring, of which the following is a specification.

This invention relates to piston rings and it is designed more especially to prevent leakage of compression and the by-passing of oil in the explosion chamber of a motor, at the same time materially reducing the friction of the rings upon the cylinder wall.

A further object is to provide a piston ring with a novel form of keeper joint which will not allow the ends of the ring to get out of position in the grooves of the piston while being installed, nor permit the ends of the ring to be crowded inwardly or outwardly.

A still further object is to provide a joint which acts as an efficient seal against the passage of oil or the loss of compression.

The invention also has for an object the provision of means whereby the ring is prevented from digging into the walls of the piston groove and of the cylinder.

This application may be considered a continuation of my copending application filed August 14, 1922, Serial No. 581,661.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is a side elevation of a portion of a piston ring embodying the present improvements, the joint being shown.

Fig. 2 is a perspective view of one end portion of the ring.

Fig. 3 is a perspective view of the other end portion of the ring.

Fig. 4 is a section on line 4—4, Fig. 1.

Fig. 5 is a section through a portion of a piston showing a group of three rings applied thereto.

Referring to the figures by characters of reference A designates a portion of the wall of a cylinder and B designates a portion of a piston, this piston, in the present instance, being formed with spaced annular grooves C, D and E, each of which is adapted to receive one piston ring of a group.

The groove D as well as the groove E is adapted to receive a piston ring such as has been illustrated in detail in Figs. 1 to 4 inclusive. This ring is provided, at one end, with a tongue, the ring being indicated at 1 and the tongue at 2. The tongue is produced by cutting away approximately one-half the thickness of the ring so as to leave a shoulder 3 at the inner end of the tongue extending at right angles to the upper and lower faces of the ring. A longitudinal groove 4 is formed in the bottom surface of the tongue and is preferably rounded transversely as shown. The other end of the ring has its upper portion cut away to provide a tongue 5, there being a shoulder 6 at the inner end of the tongue at right angles to the upper and lower faces of the ring. A longitudinal rib 7 is formed on the upper face of the tongue 5 and a longitudinal ledge 8 is located at each side of this rib. The two tongues are so proportioned that when they are in overlapping relation the groove 4 will receive the rib 7 while the shoulders 3 and 6 will constitute end abutments for the tongues 5 and 2 respectively. The lower outer corner of the ring is provided with an annular rabbet 9 and the upper wall of the rabbet is rounded at its outer edge where it merges into the peripheral wall of the ring, as shown at 10. The inner lower edge of the ring is also slightly rounded as shown at 11 as is the upper inner edge 12 of the ring. The upper outer edge of the ring is likewise rounded as at 13, the curvature being more extensive and pronounced than at the lower and inner edges. The depth of the rabbet 9 is substantially equal to the distance the ring 1 projects beyond the piston B, this being clearly shown in Fig. 5.

The upper ring 14 occupying groove C is not provided with a rabbet but is otherwise of the same construction as the rings 1.

As shown in Fig. 5 when the rings are assembled pockets F and G are formed between them. It has been found, in actual practice, that during the reciprocation of the piston partial vacuums will be formed within these pockets for the reception and retention of oil, this oil being properly applied to the surface of the cylinder during the upstroke of the piston and becoming pocketed during the return stroke so as to cooperate with the rounded corners of the rings and the wall of the piston to provide an effective seal against the loss of compression. In other words the lubricant contained within the pockets will serve to wedge into the annular grooves formed between the wall of the cylinder and the rounded outer corners of the rings, thereby acting positively to prevent compression from escaping past the group of rings and the pockets between them.

It is essential that the rings be retained firmly within the grooves. Should these rings be provided with sharp inner edges as well as sharp outer edges, they would tend to bite into and mutilate the walls of the grooves as well as the wall of the cylinder. The abrasive action thus set up would soon cause the rings to work loose within the grooves and tilt out of position, thereby allowing the escape or leakage of oil and compression. By providing the rounded corners, as shown and described, this undesirable result is avoided and the rings are retained constantly in proper positions to produce the desired results. By providing the particular joint shown and described the ends of the ring are prevented from shifting inwardly or outwardly independently of each other; are caused to maintain the proper curvature while in position on the piston, and will operate positively to prevent leakage of oil or compression between the tongues. It is unnecessary to provide the piston or the rings with drain openings and, consequently, the proper retention of oil within the pockets during the operation of the piston is insured.

What is claimed is:—

1. A piston ring provided at each end with a projecting tongue, said tongues being normally in overlapping relation, there being a longitudinal groove in one of the tongues, and a longitudinal rib upon the other tongue normally seated in the groove, the corners of the ring being rounded.

2. A piston ring having interfitting tongues at its ends disposed in overlapping relation to provide a sealing joint, there being an annular rabbet formed in the lower outer corner portion of the ring, the upper and lower inner corners of the ring being rounded, and the upper and lower edges of the outer cylinder engaging surface of the ring being also rounded.

3. The combination with a piston having spaced annular grooves, of rings seated in the grooves and projecting therefrom, the upper and lower edges of the outer or cylinder engaging surfaces of the rings being rounded, there being an oil retaining pocket between the projecting portions of the rings, the rounded corners of the rings being adapted to cooperate with oil trapped in the pocket to effect a seal.

4. The combination with a piston having spaced annular grooves, of piston rings seated in the grooves and having interfitting overlapping ends providing seals, said rings projecting outwardly from the piston and having the upper and lower edges of the outer or cylinder engaging surfaces thereof rounded for cooperation with a cylinder wall to provide annular wedge-like grooves, the said rings cooperating to provide an annular oil trapping pocket.

5. The combination with a cylinder and a piston adapted to work therein having annular grooves, of piston rings seated in the grooves and having overlapping ends providing seals, said rings projecting outwardly from the piston and having the upper and lower edges of the outer or cylinder engaging surfaces thereof rounded for cooperation with the cylinder wall to provide annular grooves tapering in cross section, the said rings cooperating with the cylinder and piston to provide an annular pocket between the rings.

In testimony that I claim the foregoing as my own, I have hereto affixed my signature in the presence of two witnesses.

EUGENE C. McMILLAN.

Witnesses:
L. B. SMITH,
J. C. HARRIS.